UNITED STATES PATENT OFFICE.

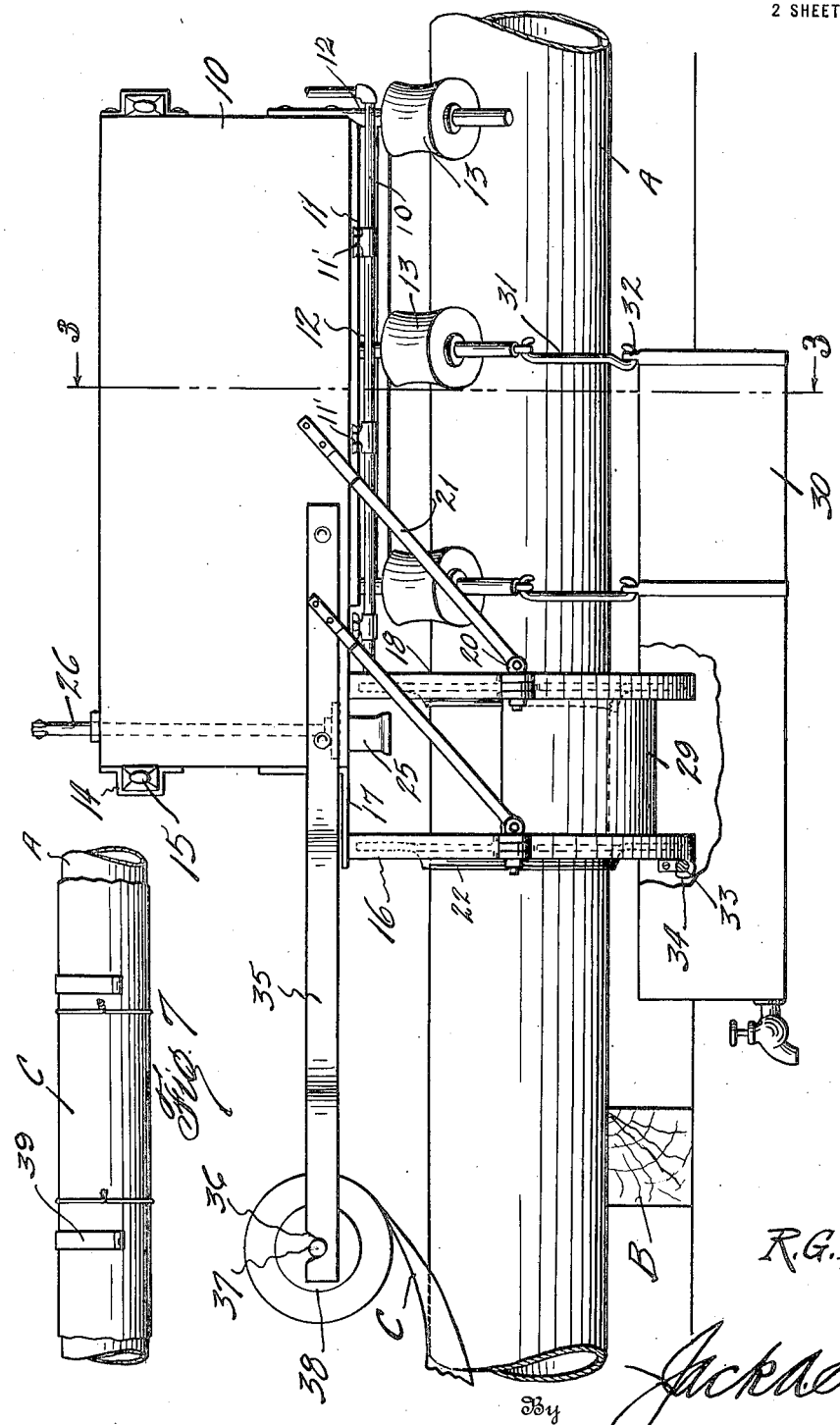

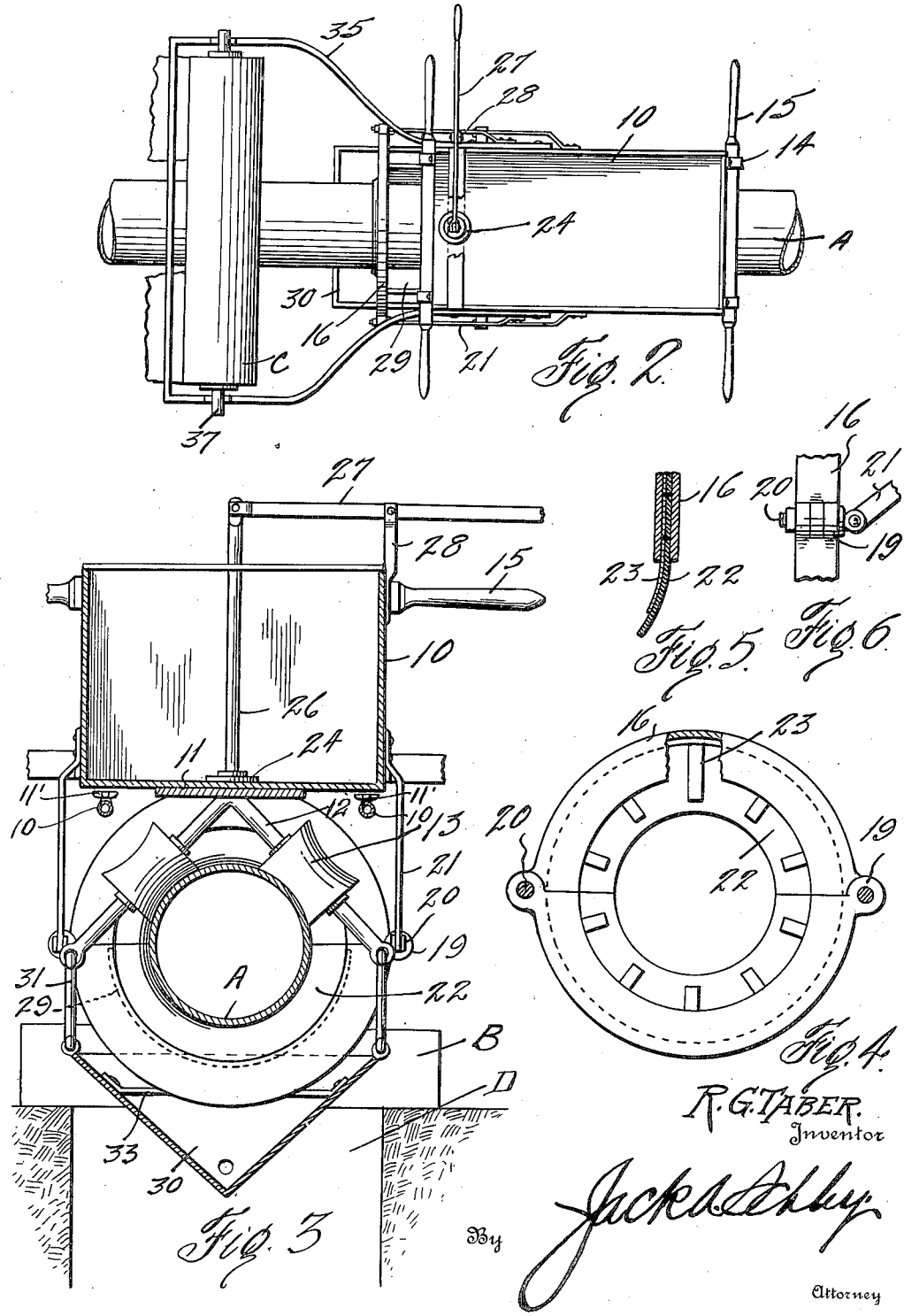

ROCK G. TABER, OF DALLAS, TEXAS.

PIPE-COATING MACHINE.

1,375,979.   Specification of Letters Patent.   Patented Apr. 26, 1921.

Application filed March 4, 1920. Serial No. 363,273.

*To all whom it may concern:*

Be it known that I, ROCK G. TABER, a citizen of the United States, residing at Dallas, in the county of Dallas and State of Texas, have invented certain new and useful Improvements in Pipe-Coating Machines, of which the following is a specification.

This invention relates to new and useful improvements in pipe coating machines.

It is customary to coat pipes which are used for oil pipe lines and gas pipe lines, with a protective material such as tar or the like. The pipe line is coated before it is lowered into the trenches. It is also the practice to cover this coated surface with tar paper or similar material which is suitably fastened on the pipes and caused to adhere thereto by the coating. It has been the practice to do this work by hand and a number of workmen are required and the process is expensive, laborious and slow.

The aim of this invention is to provide a machine which may be mounted on the pipe line and constructed to apply a coating to the pipe as said machine is moved along said pipe, whereby the work is carried out expeditiously and with a minimum amount of labor and at a reduced cost. Means may also be provided for supplying the paper covering to the pipes as it is coated.

In carrying out the invention a tank is mounted on rollers or other supports which is gaged on the pipe line. The tank discharges onto the pipe and a swab surrounding the pipe is attached to the machine so as to spread the coating. A receptacle for catching the coating and submerging the lower half of the pipe may also be provided. A drip tank is carried under the pipes for catching the surplus of the coating. A support and a paper drum may also be carried by the machine in rear of the swab and the paper wound upon the roller so as to be unwound and spread upon the pipes as the machine is moved forward.

The invention will be more readily understood from a reading of the following specification and by reference to the accompanying drawings, in which an example of the invention is shown, and wherein:

Figure 1 is a side elevation of a machine constructed in accordance with the invention and mounted on a pipe line, Fig. 2 is a plan view of the same, Fig. 3 is a transverse vertical sectional view on the line 3—3 of Fig. 1, Fig. 4 is a face view of one of the swabs, Fig. 5 is a sectional detail of the swab, Fig. 6 is a detail of the swab fastening means, and Fig. 7 is an elevation of a portion of a pipe line covered with paper.

In the drawings, the numeral 10 designates a tank, which may be rectangular in cross section or have any other suitable shape. This tank is mounted on a longitudinal frame plate 11. Transverse triangular supports 12 depend from the plate 11 and a corresponding support 12 is fastened to the forward end of the tank. Each support carries a pair of dolly rollers 13 which are rotatably confined thereon so as to gage upon the opposite sides of the upper portion of a pipe A. The tank has keepers 14 at each end near its top for receiving handle members 15 extending transversely of the machine and projecting on each side thereof.

A swab ring 16 has its upper end fastened to an angle member 17 which is secured to the rear end of the tank 7. A second swab 18 is suitably fastened to the bottom of the tank a short distance from its rear end. Each swab ring is composed of two sections having intermeshing ears 19, receiving eye-bolts 20. Forwardly inclined braces 21 extend from the eye-bolts and have their upper ends secured to the tank. Each ring is provided with an inner channel in which a flexible washer or swab collar 22 is fastened. Each collar is of such internal diameter as to snugly embrace the pipe A and trail rearwardly from its ring. In order to lend stability to the collars, radial flat springs 23 are arranged in the rings so as to engage the rear sides of the collars, as shown in detail in Figs. 4 and 5. The springs 23 are preferably adapted to be removed from the rings, in order that similar springs of different stiffnesses may be substituted therefor. When a thick composition or paint is being applied to the pipe, it is advantageous to employ stiffer springs, than when a thinner composition is being employed.

It may be desirable to heat the composition or material within the tank 10, such as when tar or the like is being applied to the pipes. This heating may be effected by any suitable means, and for the purpose of illustration I have shown pipes 10', carrying burners 11', arranged beneath the tank 10. Fuel, such as gas or oil may be supplied to these pipes from any suitable source. The invention is in no sense restricted to the employment of the heating means, as the apparatus may operate with some degree of success without it.

A valve 24 in the tank closes the top of a discharge spout 25 depending from the bottom of the tank between the rings 16 and 18. A valve rod 26 extends upwardly from the valve to the tank and is pivoted to the inner end of a lever 27 which is mounted on a post 28 on the side of the tank. The tank is filled with hot tar or other coating material and by pressing downward on the outer end of the lever 27 the valve 24 is lifted so that the contents of the tank may discharge through the spout 25 which latter is located over the center of the pipe A. The coating material flows from this spout onto the pipe and spreads over the same so as to flow downward on each side. A trough 29 is mounted between the rings and conforms to the shape of the same. The trough has its upper edges terminating about the center of the pipe and the coating material flows from the pipe into this trough and fills the same so that as the machine is pulled forward on the pipe the latter being submerged in the trough will have its lower half coated as will be obvious.

A drip vat 30 is suspended from the two rear supports 12 by a link 31 engaging in eyes 32 on each side of the vat; while a rod 33 extending across the rear portion of the vat engages in a hook 34 carried at the bottom of the rings 16. This vat catches the surplus coating which drips from the pipe. It is customary to support the pipe A on cross timbers B which are laid across the top of the trench D. As the machine is moved forward on the pipe A it will be necessary to remove the timbers B as they are encountered and replace the same after the vat 30 has passed. It is obvious that by means of the swab collars 22 and the tank 29 the pipe A will be adequately coated and the work will be done quickly and satisfactorily.

If it should be desired to cover the pipe with tar paper or other material, a yoke frame 35 may be fastened to each side of the tank so as to project rearwardly therefrom over the pipe A. This frame has its rear end portion enlarged and provided at each end with notches 36 for receiving trunnions 37 of a drum 38. A roll of paper C is placed on the drum and unwound so as to adhere to the coated pipe. As the machine is moved forward the paper C will unwind and fall on the pipe as will be obvious. The paper being wider than the circumference of the pipe will fall downward on the sides thereof. A workman may place temporary clips 39 upon the upper portion of the paper and pipe, thus preventing any displacement of the partly applied paper, upon the forward movement of the machine. The workman next folds the lower edges of the paper about the lower portion of the pipe, causing such lower edges to overlap, and finally ties the same in the overlapped position to the pipe, permanently, by tie wires, the clips 39 being then removed. It is to be distinctly understood that the machine may be used without the paper applying feature and simply as a coating machine.

Having thus described my invention, I claim:—

1. In a machine for coating pipes, a tank for holding the fluid coating material, supporting means for the tank, a second tank arranged beneath the pipes for receiving the lower portion of the pipes and holding the coating material discharging from the upper portion of the pipe in contact with the lower portion of said pipe, and means for supplying the fluid material from the tank to the upper portion of the pipes.

2. In a machine for coating pipes, a tank for holding a coating fluid, means for supporting the tank above the pipes and to move the same longitudinally thereof, outlet means for the tank to discharge the fluid upon the pipes, a second tank arranged beneath the pipes and adapted to catch the fluid from the pipes and to apply the same to the lower portion of the pipes, means connecting the second tank and first tank, and a third tank arranged beneath the second tank to catch the waste fluid and connected with the first tank to move therewith.

3. In a machine of the character described, a tank for holding a coating fluid, supporting means for the tank whereby it is adapted to move longitudinally of the pipes to be coated, outlet means for the tank for supplying the fluid to the pipes, a support connected with the tank, and supporting means for a roll of paper or the like connected with the support.

4. In a machine for coating pipes, a tank for holding the fluid coating material, wheeled supporting means for the tank, outlet means for the tank adapted to discharge the fluid upon the upper portion of the pipe, a pair of swab rings adapted to surround the pipe and spaced from each other and connected with the tank to move therewith, flexible annular washers held within the swab rings, and a tank to receive the lower portion of the pipe and arranged between the swab rings for holding the fluid in contact with the lower portion of the pipe between said washers.

5. In a machine for coating pipes, a tank for holding the fluid coating material, outlet means for the tank, pairs of downwardly diverging supporting elements secured to the tank and adapted for arrangement upon opposite sides of the pipe, wheels carried by the supporting elements, a tank arranged beneath the pipe to catch the fluid discharging therefrom, suspension means for the tank connected with the ends of said elements, and means arranged between the two tanks to spread the fluid upon the pipe.

6. In a machine for coating pipes, a tank for holding a coating fluid and having outlet means, wheels to support the tank and adapted to travel upon the pipe, means traveling with the tank to properly spread the fluid applied to the pipe, a support connected to the tank and extending rearwardly beyond the same and the spreading means, and supporting means for a roll of paper or the like carried by the support.

In testimony whereof I affix my signature.

ROCK G. TABER.